T. DRAPER.
TUBE WELDING APPARATUS.
APPLICATION FILED JAN. 8, 1915.
1,218,751.
Patented Mar. 13, 1917.
2 SHEETS—SHEET 1.
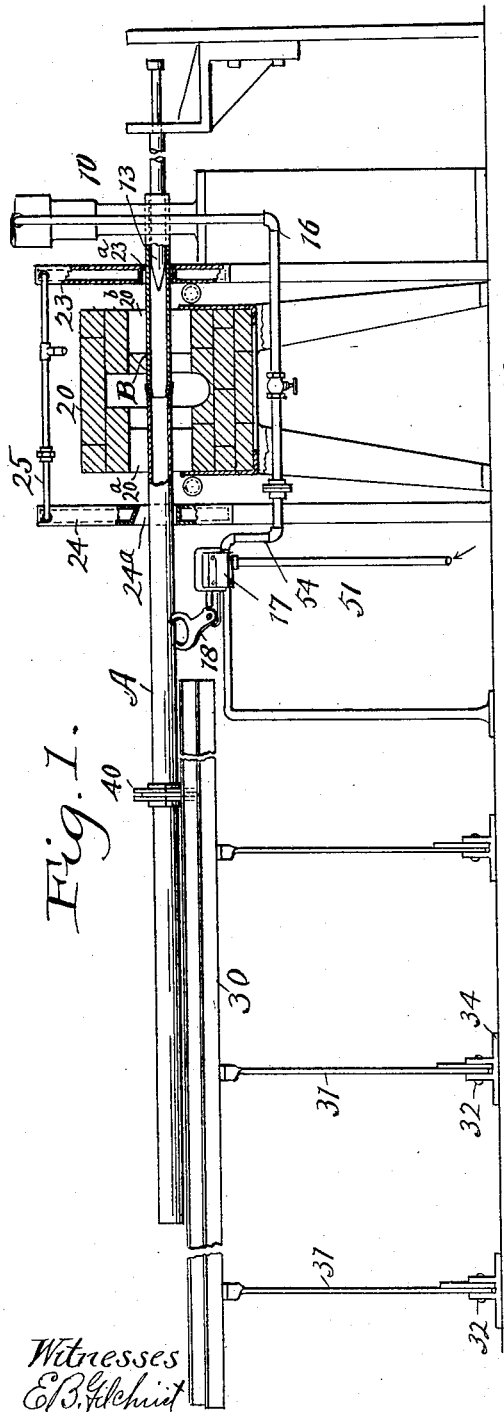
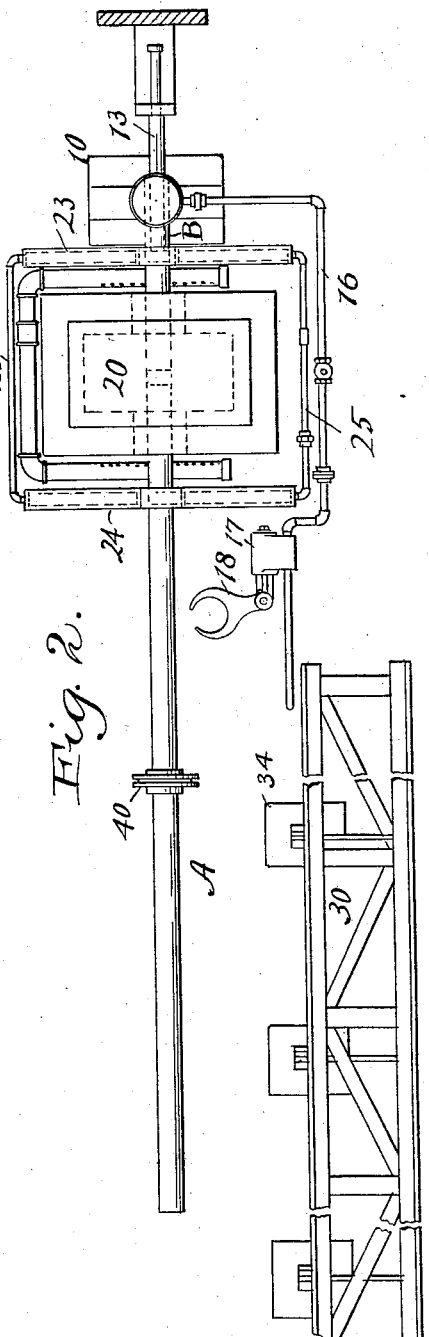

T. DRAPER.
TUBE WELDING APPARATUS.
APPLICATION FILED JAN. 8, 1915.
1,218,751.
Patented Mar. 13, 1917.
2 SHEETS—SHEET 2.
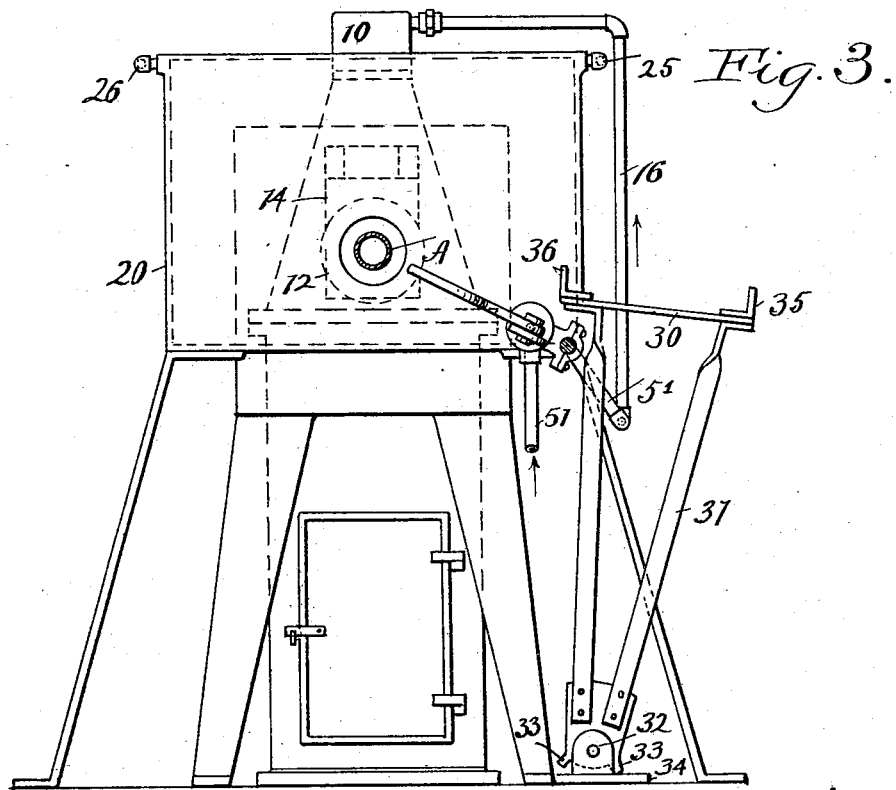
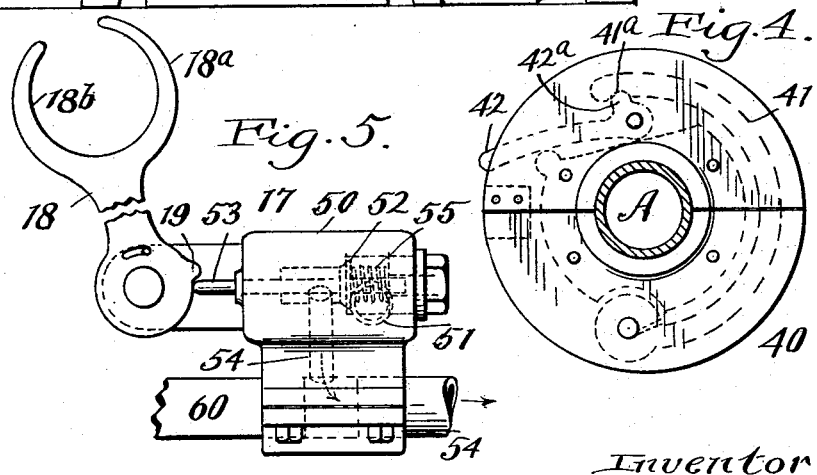
Witnesses.
E. B. Gilchrist
A. J. Hudson
Inventor
Thomas Draper
by Thurston & Swig
atty

UNITED STATES PATENT OFFICE.

THOMAS DRAPER, OF PORT HURON, MICHIGAN, ASSIGNOR TO THE DRAPER MANUFACTURING COMPANY, OF PORT HURON, MICHIGAN, A CORPORATION OF MICHIGAN.

TUBE-WELDING APPARATUS.

1,218,751.   Specification of Letters Patent.   Patented Mar. 13, 1917.

Application filed January 8, 1915. Serial No. 1,089.

*To all whom it may concern:*

Be it known that I, THOMAS DRAPER, a citizen of the Dominion of Canada, residing at Port Huron, in the county of St. Clair and State of Michigan, have invented a certain new and useful Improvement in Tube-Welding Apparatus, of which the following is a full, clear, and exact description.

This invention is an apparatus by means of which one may weld together two metal tubes regardless of their actual or relative length, within the capacity of the apparatus, and produce a single straight tube. This is especially useful as means for utilizing the unspoiled parts of boiler flues, or boiler tubes, by welding two of them together, to make good usable flues or tubes of the required length; or to lengthen tubes or flues which are too short. The apparatus is so contrived that the operator, without serious inconvenience, or without any unusual degree of skill, may rapidly weld such tubes together.

The invention consists in the construction and combination of parts shown in the drawing and hereinafter described and definitely pointed out in the appended claims.

In the drawing Figure 1 is a side elevation of the apparatus with the furnace and adjacent parts shown in a vertical section; Fig. 2 is a plan view of the apparatus; Fig. 3 is an end view from the left end of Fig. 1; Fig. 4 is a view of the valve-operating clamp to be applied to a tube section which is to be welded to another section; Fig. 5 is a plan view of the valve-operating mechanism therefor which controls the flow of the operating fluid to the welding machine, which constitutes a part of the apparatus; Fig. 6 is a plan view of the clamp shown in Fig. 4.

Referring to the parts by numerals, 10 represents a flue welding machine of suitable construction. The machine shown somewhat diagrammatically is a pneumatic flue welder of well-known construction, which includes a lower fixed die 12 and an upper movable die 14, (shown by dotted lines in Fig. 3) and a mandrel 13 which is fixed to a suitable support and projects between these two dies and has a tapered front end. This pneumatic flue welder is supplied with compressed air from a pipe 16, in which is a valve 17 that controls the flow of said compressed air.

20 represents a furnace of well-known construction, having in its opposite side walls the holes $20^a$, $20^b$, which permit the tubes to be passed through the furnace.

23 and 24 represent water cooled fire screens. These are thin upright metal boxes through which cold water is kept continually circulating by means of the pipes 25—26. The fire screen 23 is located between the furnace and the welding machine 10, and its purpose is to protect said machine from the intense heat generated within the furnace. This screen has through it, and in alinement with the space between the dies of the welder, a cored hole $23^a$. The other fire screen 24 is for the purpose of protecting the operator from the intense heat generated within the furnace, and this has through it a cored hole $24^a$ of such size and shape that it not only permits the passage of the tubes which are to be welded, but also permits the operator to look through it into the furnace and thereby determine whether the overlapping ends of said tubes are properly positioned within the furnace to be heated to the welding heat, and also to determine when it is the proper heat for welding.

Adjacent to where the operator stands, that is to say on the opposite side of the water screen 24 to that on which the furnace lies, is a swinging table 30. It is fixed to the upper ends of a plurality of arms 31 which are pivotally mounted on alined pivots to brackets 32 fixed to the floor; and these arms are provided with stops 33 adapted to engage the base plates 34 of said brackets and thereby limit the swinging movement of this table. The table 30 has, along its front edge, an upwardly extended stop or stops, which preferably take the form of a flange 35, and another stop, or stops, shown as a flange 36 along its rear edge. This frame may be swung over to the left of the position shown in Fig. 3, so that its rear edge shall be under the tubes A and B, these being the two tubes which are to be welded together. When they have been welded together they are drawn back quickly and allowed to drop upon this table. At this time the welded joint between the two tubes is soft and the produced tube is likely to bend at this point; but when the welded tube has been dropped upon this table the table is allowed to swing to the position shown in Fig. 3, in which it is inclined outward, as shown. The tube will, therefore, roll crosswise of this table and in so rolling will be straightened out if it has happened to bend at the welded joint, and will be held upon the table by the flange 35 until the joint is cool and hard.

In using the described apparatus the end of one tube, as A, is flared or reamed out, and the end of the other tube B is driven into the same. Then the shorter tube B is pushed through the hole 24ª in the water screen 24, and through the furnace, and pushed over the mandrel 13. And this movement is continued until the joint between the tubes is brought to the proper position in the furnace to be heated thereby. The operator looking through the hole 24ª can see when this joint is in the proper position, and can also see when it has become hot enough to weld.

A collar 40 has previously been clamped to the tube A at a known distance back from its flared end. The position of this collar is such a distance back of the arm 18ª of the forked valve-operator 18, when the joint between the tubes is properly placed in the furnace, that it will engage and actuate said valve-operator when the tube A has been moved far enough to carry the heated joint from the furnace into the proper position with respect to the welding machine—that is to say, between the dies of the welding machine.

The actuation of the valve-operator 18 by the said collar 40 will open the valve 17 which controls the flow of compressed air to the welding machine, and thereupon the welding machine will begin to work. The operator may turn the tube A so that all parts of the joint will be subjected to the welding action of the dies. Then, when after a suitable interval, the joint is thoroughly welded, the operator jerks the tube backward. The collar 40 now engages the other arm 18ᵇ of the valve-operator, and thereby causes the valve to close. The composite tube, composed of the two tubes A and B welded together, is now drawn entirely through the hole 24ª, the collar 40 is removed therefrom, and the composite tube is allowed to drop upon the swinging table 30, which has in the meantime had its rear part swung beneath said tube. The operator now lets go of the swinging by gravity table which thereupon swings to the position shown in Fig. 3. The tube will roll along the now inclined top of the table and will be thereby straightened.

The particular construction of the so-called valve 17 is not important so long as the valve mechanism is adapted to be operated by the collar 40 on tube A. The construction illustrated in the drawing includes a valve casing 50 which is clamped on a supporting pipe 60. It has an inlet port 51, and an outlet port 54, both of which are shown by dotted lines in Fig. 5; and the fluid supply pipe is connected in the valve casing in communication with this outlet port. A valve 52 in the casing is closed by a spring 55, so that it prevents the flow of air from said inlet to said outlet port. This valve has a stem 53 projecting outside of the valve casing to a position such that its outer end may be engaged by a cam 19 on the hub of the valve-operator 18 which is pivoted to a fixture. When the valve-operator 18 is moved by the collar 40, as the tube A—B is pushed along into the embrace of the welding machine, this cam 19 will engage this valve stem and open the valve, as stated. If, however, the tube A—B is moved along too far so as to carry its hot joint beyond the welding dies, the cam 19 will pass the stem 50 so far that the valve will close. In other words, the welding machine will not operate unless the hot joint is in the right position with respect to the dies of the welding machine. The valve-operator has two fork arms 18ª, 18ᵇ, as shown, and they are so arranged that the collar 40 will engage the right hand arm when the tube is being moved toward the welding machine. This will bring the left hand arm behind this collar, so that when the tube is moved backward the arm 18ᵇ will be engaged by collar 40, and the valve-operator 18 will be moved in the direction such as will allow the valve 52 to close.

The collar 40 may have any suitable construction but should be adapted to be quickly applied to, and removed from, the tube A. It may, for example, be composed of two semi-cylindrical parts, one carrying a spring 41 having a notch 41ª in it, and the other carrying a pivoted latch lever 42 having an arm 42ª, adapted to engage the notch 41ª when the two halves of the collar have been put around the tube and to clamp said halves onto said tube.

While the apparatus hereinbefore described is particularly useful for welding together sections of tubing, it obviously may be employed to weld two rods together.

It is also obvious that a compressed air welding machine is not essential. Any suitable welding machine might be used, and in that event the fork lever, which has herein been called the valve operator, would be associated with suitable mechanism through which, as this lever was swung in one direction or the other, the welding machine would be caused to start and stop.

The great advantage of the described apparatus as compared with the previous practice, is that both tube sections are supported while the joint is being heated, one section by the operator and one by the mandrel,—and thus they continue to be supported as they are moved to transfer the joint from the furnace to the welding machine, and while the joint is being welded therein. The common practice is to heat the joint in the furnace; then to withdraw the tubes from the furnace, and to transfer them to the welding machine,—the overhanging front end of said composite tube being unsupported during the transferring period.

Having thus described my invention, what I claim is:—

1. In a tube welding apparatus, the combination of a furnace having alined holes through its end walls, a welding machine located adjacent to one end wall of said furnace, a support for the overhanging front end of two parts to be welded, which support is so placed that it will support said front end of said parts while the joint between is in the furnace and in the welding machine, and is moving from one to the other, and two fire screens, one located between one end of the furnace and said welding machine and one located alongside of the other end of the furnace, said fire screens having holes through them which are alined with the holes in the walls of the furnace and said mandrel.

2. In a tube welding apparatus, the combination of a furnace having alined holes through its end walls, a welding machine located adjacent to one end wall of said furnace, a mandrel alined with the holes in said furnace walls, and two fire screens each comprising a narrow vertical box having a cored out hole which is alined with the holes in the furnace walls, one of said fire screens being located between one end of the furnace and said welding machine, and one located along the side of the other end of the furnace, and means for continuously discharging cold water into said box-like fire screens.

3. In a tube welding apparatus the combination of a furnace having alined holes through its end walls, a support for the overhanging end of a two-part tube to be welded by said apparatus, a welding machine located between said support and one end wall of the furnace in such position that a two-part tube which extends through the furnace and through both of the holes in said end wall may take its proper position in said welding machine, a lever which controls the starting and stopping of said welding machine and is located adjacent to the other end of said furnace, and a collar adapted to be secured to the rear part of said two-part tube in position such that it will engage and operate said lever when said tube is moved endwise to carry the joint between the two parts thereof from the furnace into the embrace of the welding machine.

4. In a tube welding apparatus, the combination of a furnace having alined holes through its end walls, a fluid pressure welding machine located adjacent to one end wall of said furnace, a pipe for supplying the pressure fluid to said welding machine, a valve controlling the flow of pressure fluid through said pipe, and means for actuating said valve located adjacent to the other end wall of said furnace.

5. In a tube welding apparatus, the combination of a furnace having alined holes through its end walls, a fluid pressure welding machine located adjacent to one end wall of the furnace, a mandrel alined with the holes in said furnace walls whereby the operator standing near the other furnace wall may push through the furnace and onto the mandrel, a composite pipe or tube to be welded, a fire screen located by the side of that wall of the furnace which is adjacent the valve hereinafter mentioned,—said fire screen having through it a hole which is alined with the holes in the furnace walls,— a pipe supplying pressure fluid to said welding machine, a valve in said pipe, and means for actuating said valve.

6. In a tube welding apparatus, the combination of a furnace having alined holes through its end walls, a fluid pressure welding machine located adjacent to one end wall, a pipe for supplying pressure fluid to said welding machine, a valve in said pipe, a valve actuating device located adjacent to the other end wall of said furnace, and a device adapted to be detachably secured to one of the tubes which are to be welded together for engaging with and moving said valve actuating device.

7. In a tube welding apparatus, the combination of a furnace having alined holes through its end walls, a fluid pressure welding machine located adjacent to one end wall, a pipe for supplying pressure fluid to said welding machine, a valve in said pipe, a forked valve actuating device and a collar adapted to be detachably secured to one of the pipes which are to be welded together for engagement with the arms of the valve actuating device to open and close the valve.

8. In a tube welding apparatus, the combination of a furnace having alined holes through its end walls, a fluid pressure welding machine located adjacent to one end wall, a pipe for supplying pressure fluid to said welding machine, a valve in said pipe, a spring actuated valve for controlling the flow of pressure fluid to said welding machine, a valve stem, a pivoted valve actuating device having on its hub a cam adapted to engage said valve stem, and having also two arms, and a collar adapted to be detachably secured to one of the tubes which are to be welded in position such that it will engage one of said arms and move the valve actuating device in one direction when the tube is being pushed through the furnace toward the welding machine, and which will engage with the other arm and move said valve actuating device in the contrary direction when the tube is moved in the contrary direction.

9. In a tube welding apparatus, the combination of a furnace having alined holes through its end walls, a fluid pressure welding machine located adjacent to one end of said furnace, a mandrel alined with the holes in said furnace walls, a fire screen located between one end of the furnace and said welding machine, another fire screen located alongside of the other end of said furnace, both of said fire screens having holes through them which are alined with the holes in the furnace walls, a valve controlling flow of pressure fluid to said welding machine, a valve operator and a collar detachably secured to the tube to be welded for engaging said valve operator.

10. In a tube welding apparatus, the combination of a furnace having alined holes through end walls, a welding machine located adjacent to one end wall of said furnace, a support for the overhanging front end of a composite tube to be welded, a swinging table adapted to occupy a position beneath the line of said alined holes and to be swung away from said position and to a position in which its top surface shall be inclined, said table having a stop along its lower edge.

11. In a tube welding apparatus, the combination of a furnace having alined holes through end walls, a welding machine located adjacent to one end wall of said furnace, a mandrel alined with the holes in said furnace walls, a swinging table adapted to occupy a position beneath the line of said alined holes and to be swung away from said position and into a position in which its top surface shall be inclined, said table having stops along its inner and outer edges, and two fire screens, one located between the furnace and the welding machine, and one located between the opposite end wall of the furnace and said swinging table, which screens have holes through them which are alined with the holes in its furnace walls.

12. In a tube welding apparatus, the combination of the following parts arranged in series in the following order, to-wit: a swinging table, a fire screen, a furnace, a fire screen, a fluid pressure welding machine, and a mandrel supported by one end and extending therefrom between the dies of the welding machine and toward the furnace,—said two fire screens and the adjacent furnace walls having through them holes which are alined with said mandrel, a pipe for supplying pressure fluid to said welding machine, a valve controlling the flow of such pressure fluid, a valve actuating device located outside of the first mentioned fire screen and a collar removably attachable to a tube in such position that when said tube is passed through the holes in the fire screen and in the end walls of the furnace and onto the mandrel, the endwise movement of said tube will cause said collar to engage and operate the valve actuating device.

13. In a tube welding machine, the combination of a table having near one edge a longitudinally extending upstanding stop flange and having downwardly extended legs which are pivoted on alined pivots, stops limiting the swinging movement of said table in both directions, a furnace, a fluid pressure welding machine, two fire screens located adjacent the end walls of the furnace having alined holes and a mandrel which is alined with said holes and is adapted to support both tubes which are to be welded together when the plane of connection between said tubes is in operative position with respect to the welding machine.

In testimony whereof, I hereunto affix my signature in the presence of two witnesses.

THOMAS DRAPER.

Witnesses:
A. J. HUDSON,
L. I. PORTER.

Copies of this patent may be obtained for five cents each, by addressing the "Commissioner of Patents, Washington, D. C."